(12) United States Patent
Zlotnick

(10) Patent No.: US 6,351,566 B1
(45) Date of Patent: Feb. 26, 2002

(54) METHOD FOR IMAGE BINARIZATION

(75) Inventor: Aviad Zlotnick, Mizpe Netofa (IL)

(73) Assignee: International Business Machines, Armonk, NY (US)

( * ) Notice: Subject to any disclaimer, the term of this patent is extended or adjusted under 35 U.S.C. 154(b) by 0 days.

(21) Appl. No.: 09/519,446

(22) Filed: Mar. 2, 2000

(51) Int. Cl.⁷ .................................................. G06K 9/46
(52) U.S. Cl. ...................... 382/237; 382/270; 358/455; 358/466
(58) Field of Search ................................. 358/455, 456, 358/465, 466; 382/237, 266, 270

(56) References Cited

U.S. PATENT DOCUMENTS

| | | | | |
|---|---|---|---|---|
| 4,520,505 A | * | 5/1985 | Yamamoto et al. | 382/270 |
| 4,832,447 A | | 5/1989 | Javidi | 350/162.13 |
| 5,067,162 A | | 11/1991 | Driscoll, Jr. et al. | 382/5 |
| 5,138,671 A | * | 8/1992 | Yokoyama | 358/466 |
| 5,182,656 A | | 1/1993 | Chevion et al. | 358/452 |
| 5,191,525 A | | 3/1993 | LeBrun et al. | 364/419 |
| 5,715,325 A | | 2/1998 | Bang et al. | 382/118 |
| 5,793,887 A | | 8/1998 | Zlotnick | 382/209 |

* cited by examiner

Primary Examiner—Thomas D. Lee
(74) Attorney, Agent, or Firm—Darby & Darby

(57) ABSTRACT

A method for binarizing a gray-level input image including a plurality of pixels having respective gray-level values. A lower threshold and an upper threshold are determined. A first binary value is assigned to the pixels in the gray-level image having gray-level values above the upper threshold, and a second binary value is assigned to the pixels in the gray-level image having gray-level values below the lower threshold. The pixels in an intermediate group having gray-level values between the lower and upper thresholds are processed so as to determine optimal assignments of the pixels in the intermediate group to the first and second binary values.

27 Claims, 7 Drawing Sheets

METHOD FOR IMAGE BINARIZATION

FIELD OF THE INVENTION

The present invention relates generally to methods and apparatus for image processing, and specifically to methods for binarization of gray-level images.

BACKGROUND OF THE INVENTION

Methods of image binarization are well-known in the art. Generally speaking, these methods take a gray-level image, in which each pixel has a corresponding multi-bit gray-level value, and convert it into a binary image, in which each pixel has a binary value, either black (foreground) or white (background). Binarization is used particularly in simplifying document images, in order to process and store information that is printed or written on the document.

The fastest and simplest binarization method is simply to fix a threshold and to determine that all pixels having a gray-level value above the threshold are white, while those below the threshold are black. This method, however, frequently results in loss or confusion of the information contained in the gray-level image. This information is embodied mainly in edges that appear in the image, and depends not so much on the absolute brightness of the pixels as on their relative brightness in relation to their neighbors. Thus, depending on the choice of threshold, a meaningful edge in the gray-level image will disappear in the binary image if the pixels on both sides of the edge are binarized to the same value. On the other hand, artifacts in the binary image with the appearance of edges may occur in an area of continuous transition in the gray-level image, when pixels with very similar gray-level values fall on opposite sides of the chosen threshold.

These problems are exemplified by the following tables. Table I represents pixel values in a 5×5 image, wherein higher values represent brighter pixels:

TABLE I

| Gray | Col 1 | Col 2 | Col 3 | Col 4 | Col 5 |
|---|---|---|---|---|---|
| Row 1 | 10 | 10 | 10 | 11 | 11 |
| Row 2 | 10 | 11 | 12 | 13 | 14 |
| Row 3 | 16 | 17 | 18 | 19 | 20 |
| Row 4 | 14 | 16 | 14 | 16 | 18 |
| Row 5 | 16 | 14 | 16 | 14 | 90 |

If this image is binarized using a threshold of 85, the result will be as shown in Table II:

TABLE II

| Thr = 85 | Col 1 | Col 2 | Col 3 | Col 4 | Col 5 |
|---|---|---|---|---|---|
| Row 1 | 0 | 0 | 0 | 0 | 0 |
| Row 2 | 0 | 0 | 0 | 0 | 0 |
| Row 3 | 0 | 0 | 0 | 0 | 0 |
| Row 4 | 0 | 0 | 0 | 0 | 0 |
| Row 5 | 0 | 0 | 0 | 0 | 1 |

The large gaps surrounding the pixel in the lower right corner are represented in the binarized image, but all of the other gaps are lost. (The term "gap" is used in the context of the present patent application and in the claims to denote the absolute difference in gray level between a pair of neighboring pixels.)

On the other hand, if the threshold is set to 15, the resulting binary image will be as shown in Table III:

TABLE III

| Thr = 85 | Col 1 | Col 2 | Col 3 | Col 4 | Col 5 |
|---|---|---|---|---|---|
| Row 1 | 0 | 0 | 0 | 0 | 0 |
| Row 2 | 0 | 0 | 0 | 0 | 0 |
| Row 3 | 1 | 1 | 1 | 1 | 1 |
| Row 4 | 0 | 1 | 0 | 1 | 1 |
| Row 5 | 1 | 0 | 1 | 0 | 1 |

The gap of size 6 between rows 2 and 3, which probably corresponds to a real edge in the image, is represented in the binary image. The large gaps in the lower right corner are lost, however. At the same time, small gaps (of size 2) between rows 4 and 5, which could be due to noise, are represented in the binary image. Thus, significant edges in the gray-level image are lost, while insignificant gaps are allowed to generate artifacts.

For the reasons exemplified by these tables, practical binarization algorithms allow the binarization threshold to vary. These algorithms generally make assumptions about image content in determining the best threshold to use over the whole image or in specific areas of the image. The assumptions may relate to the sizes of objects in the image, histogram properties, noise levels or other image properties. Because they are dependent on such assumptions, binarization algorithms tend to work well on the specific type of images or objects for which they are designed, but to fail on others. For example, a text-oriented binarization algorithm can work well on a document image that contains text on a plain background, but may fail when the background is textured. Furthermore, document images frequently contain salient features other than simple text, such as symbols, lines and boxes, which are important to preserve in the binary image and are lost when text-oriented binarization is used.

Image "trinarization" has been suggested as a method for processing gray-level images, although not in the context of document imaging. Typically, a range of "gray" pixel values is defined intermediate the low values of the black range and the high values of the white range. The resultant trinary image has been found to be useful in a number of image recognition and image correlation applications.

For example, U.S. Pat. No. 5,067,162, whose disclosure is incorporated herein by reference, describes a method and apparatus for verifying identity using image correlation, typically based on fingerprint analysis. In order to eliminate uncertainty and variability of edge determinations in the fingerprint image, a trinarization technique is used to divide all pixels into one of three levels: black, gray or white. A histogram of gray values of the gray-scale image is determined, and black-gray and gray-white threshold values are established according to equal one-third distributions. All pixels having gray values darker than the black-gray threshold value are converted into black pixels; all pixels having gray values lighter than the gray-white threshold value are converted into white pixels; and all other pixels are ignored in subsequent correlation calculations. Thus, the black and white pixels represent with high confidence ridge and valley regions of the fingerprint image, while the gray pixels represent the transition regions between the ridges and valleys.

As another example, U.S. Pat. No. 5,715,325, whose disclosure is incorporated herein by reference, describes apparatus and methods for detecting a face in a video image. Face images are processed to eliminate fine detail and provide a hard contrast, resulting in an image that is nearly binarized (having dark blocks and light blocks) but still contains some blocks that cannot be clearly categorized. To promote simplicity in processing, the image is treated as a trinary image, wherein dark regions are identified with negative ones (−1's), light regions are identified with ones (1's), and undefinable regions are identified with zeros (0's). The trinary image is then compared with different face templates to find an optimal match.

SUMMARY OF THE INVENTION

It is an object of the present invention to provide improved methods and apparatus for image processing, and particularly for processing of document images.

It is a further object of some aspects of the present invention to provide improved methods for image binarization.

It is still a further object of some aspects of the present invention to provide a method for trinarization of an image.

In preferred embodiments of the present invention, a gray-level input image is trinarized, generally as a preparatory step in generating a binary output image. The input image is first analyzed in order to characterize variations among the gray-level values of the pixels in the image, such as gaps between the values of neighboring pixels. Based on these variations, upper and lower binarization thresholds are determined, such that pixels having gray-level values above the upper threshold are classified as white, and those below the lower threshold are classified as black. The pixels having gray-level values between the lower and upper thresholds, referred to hereinafter as intermediate or gray pixels, are then preferably processed so as to determine an optimal classification of these pixels as black or white.

Preferably, the upper and lower binarization thresholds are chosen in a manner designed to increase the number of significant edges in the input image that are preserved in the output binary image, while decreasing the number of artifact edges that occur. Generating the binary image in this manner conveys the salient features of the input image clearly, substantially without dependence on the type of image content. A range of different threshold values are evaluated against the gray-level variations among the pixels, so as to choose optimal upper and lower thresholds. Preferably, the evaluation is based on a statistical analysis of the gray-level gaps between the pixels. Alternatively or additionally, other statistical analyses and information cues, such as actual edges found by edge detection algorithms, may be used in choosing the thresholds.

In some preferred embodiments of the present invention, the intermediate pixels are classified based on their relation to other neighboring pixels. Preferably, pixels that are significantly brighter than an average of their neighbors are classified as white, while those significant darker than the average are classified as black. This classification need not depend on the chosen upper and lower thresholds. Pixels that do not differ significantly from the average of their neighbors are typically classified using a threshold, such as an average of the upper and lower thresholds.

Alternatively, other methods may be applied to classify or otherwise process the intermediate pixels. In one preferred embodiment, a text-oriented binarization algorithm is applied to the gray-level image, and the intermediate pixels are classified using the results of this algorithm. In another preferred embodiment, the gray-level values of the intermediate pixels are stored along with the binary values of the other pixels. Storing the image in this manner requires far less memory than the full gray-level image, but nearly all of the significant information in the image is preserved for use when the image is recalled for later processing or viewing by a human operator.

There is therefore provided, in accordance with a preferred embodiment of the present invention, a method for image binarization, including:

receiving a gray-level input image including a plurality of pixels having respective gray-level values;

determining a lower threshold and an upper threshold, which is greater than the lower threshold by a selected difference;

assigning a first binary value to the pixels in the gray-level image having gray-level values above the upper threshold and a second binary value to the pixels in the gray-level image having gray-level values below the lower threshold; and processing the pixels in an intermediate group having gray-level values between the lower and upper thresholds so as to determine optimal assignments of the pixels in the intermediate group to the first and second binary values.

Preferably, determining the lower and upper thresholds includes analyzing variations among the gray-level values of the pixels in the input image and determining the thresholds responsive to the analyzed variations. Most preferably, analyzing the variations among the gray-level values includes finding edges in the input image, and determining the thresholds includes selecting the thresholds so as to preserve the edges in an output image made up of the assigned binary values.

Additionally or alternatively, analyzing the variations among the gray-level images includes finding gaps between the gray levels of neighboring pixels, and determining the thresholds includes selecting the thresholds so as to preserve the gaps that are significant in preference to the gaps that are not significant in an output image made up of the assigned binary values. Preferably, selecting the thresholds includes defining the gaps that are significant as those whose absolute magnitude is greater than the selected difference between the upper and lower thresholds. Most preferably, selecting the thresholds includes selecting the upper and lower thresholds so as to maximize a merit score computed for multiple different pairs of upper and lower thresholds, wherein the score correlates positively with the number of significant gaps preserved in the output image by the selected thresholds, and correlates negatively with the number of gaps that are not significant that are preserved and the number of significant gaps that are not preserved in the output image by the selected thresholds.

Preferably, determining the thresholds includes selecting the thresholds so as to preserve edge information in an output image made up of the assigned binary values. Most preferably, selecting the thresholds includes choosing the thresholds substantially without dependence on the type of image feature to which the information belongs. Additionally or alternatively, selecting the thresholds includes finding an optimal average value of the upper and lower thresholds and finding an optimal value of the selected difference between the thresholds.

Further preferably, processing the pixels in the intermediate group includes analyzing variations among the gray-level values of the pixels in the input image and determining the assignments of the pixels to the first and second binary values responsive to the analyzed variations. Most preferably, determining the assignments responsive to the analyzed variations includes finding a significant difference between the gray-level value of one of the pixels and the gray-level values of other pixels in its neighborhood, and assigning the pixel to the first or second binary value responsive to the difference.

In a preferred embodiment, processing the pixels in the intermediate group includes applying a binarization method optimized for text to determine the optimal assignments of the pixels in the intermediate group.

Preferably, the method includes outputting a binary image made up of the assigned binary values of the pixels.

There is also provided, in accordance with a preferred embodiment of the present invention, a method for processing a gray-level input image, which includes a plurality of pixels having respective gray-level values, the method including:

analyzing variations among the gray-level values of the pixels in the input image;

responsive to the analyzed variations, determining a lower threshold and an upper threshold, which is greater than the lower threshold by a selected gap size;

assigning a first binary value to the pixels in the gray-level image having gray-level values above the upper threshold and a second binary value to the pixels in the gray-level image having gray-level values below the lower threshold; and generating a trinary output image, in which the pixels assigned the first and second binary values are represented by their respective binary values, and the pixels in an intermediate group having gray-level values between the lower and upper thresholds are represented by their respective gray-level values.

In a preferred embodiment, generating the trinary output image includes displaying the output image. In another preferred embodiment, generating the trinary output image includes storing the output image in a memory.

There is additionally provided, in accordance with a preferred embodiment of the present invention, apparatus for image binarization, including an image processor, which is coupled to receive a gray-level input image including a plurality of pixels having respective gray-level values, and which is adapted to determine a lower threshold and an upper threshold, which is greater than the lower threshold by a selected difference, to assign a first binary value to the pixels in the gray-level image having gray-level values above the upper threshold and a second binary value to the pixels in the gray-level image having gray-level values below the lower threshold, and to process the pixels in an intermediate group having gray-level values between the lower and upper thresholds so as to determine optimal assignments of the pixels in the intermediate group to the first and second binary values.

There is further provided, in accordance with a preferred embodiment of the present invention, apparatus for processing a gray-level input image, which includes a plurality of pixels having respective gray-level values, the apparatus including an image processor, which is adapted to analyze variations among the gray-level values of the pixels in the input image and, responsive to the analyzed variations, to determine a lower threshold and an upper threshold, which is greater than the lower threshold by a selected gap size, and to assign a first binary value to the pixels in the gray-level image having gray-level values above the upper threshold and a second binary value to the pixels in the gray-level image having gray-level values below the lower threshold, thus to generate a trinary output image, in which the pixels assigned the first and second binary values are represented by their respective binary values, and the pixels in an intermediate group having gray-level values between the lower and upper thresholds are represented by their respective gray-level values.

In a preferred embodiment, the apparatus includes a display, which is coupled to the processor so as to receive and display the trinary output image. In another preferred embodiment, the apparatus includes a storage memory, which is coupled to the processor so as to receive and store the trinary output image.

There is moreover provided, in accordance with a preferred embodiment of the present invention, a computer software product for processing an input image, including a computer-readable medium having program instructions stored therein, which instructions, when read by a computer, cause the computer to receive a gray-level input image including a plurality of pixels having respective gray-level values, to determine a lower threshold and an upper threshold, which is greater than the lower threshold by a selected difference, to assign a first binary value to the pixels in the gray-level image having gray-level values above the upper threshold and a second binary value to the pixels in the gray-level image having gray-level values below the lower threshold, and to process the pixels in an intermediate group having gray-level values between the lower and upper thresholds so as to determine optimal assignments of the pixels in the intermediate group to the first and second binary values.

There is furthermore provided, in accordance with a preferred embodiment of the present invention, a computer software product for processing a gray-level input image, which includes a plurality of pixels having respective gray-level values, the product including a computer-readable medium having program instructions stored therein, which instructions, when read by a computer, cause the computer to analyze variations among the gray-level values of the pixels in the input image and, responsive to the analyzed variations, to determine a lower threshold and an upper threshold, which is greater than the lower threshold by a selected gap size, to assign a first binary value to the pixels in the gray-level image having gray-level values above the upper threshold and a second binary value to the pixels in the gray-level image having gray-level values below the lower threshold, and to generate a trinary output image, in which the pixels assigned the first and second binary values are represented by their respective binary values, and the pixels in an intermediate group having gray-level values between the lower and upper thresholds are represented by their respective gray-level values.

The present invention will be more fully understood from the following detailed description of the preferred embodiments thereof, taken together with the drawings in which:

DETAILED DESCRIPTION OF PREFERRED EMBODIMENTS

Figure 1:
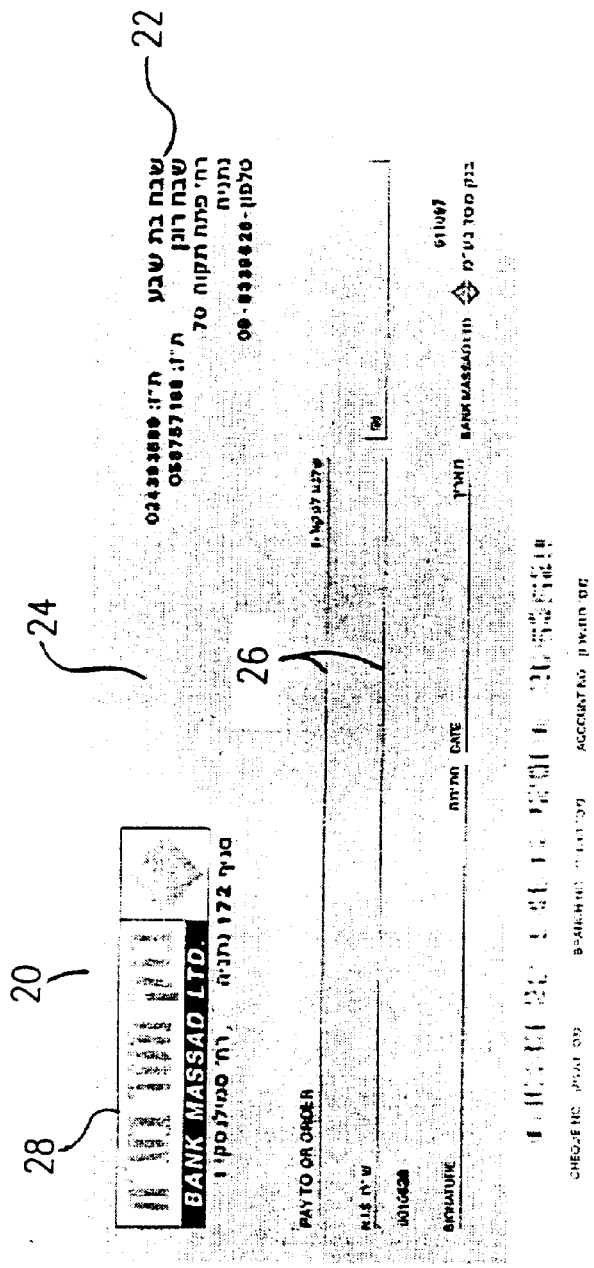
FIG. 1 is a schematic reproduction of a gray-level image captured by a scanner, as is known in the art.
Figure 2:
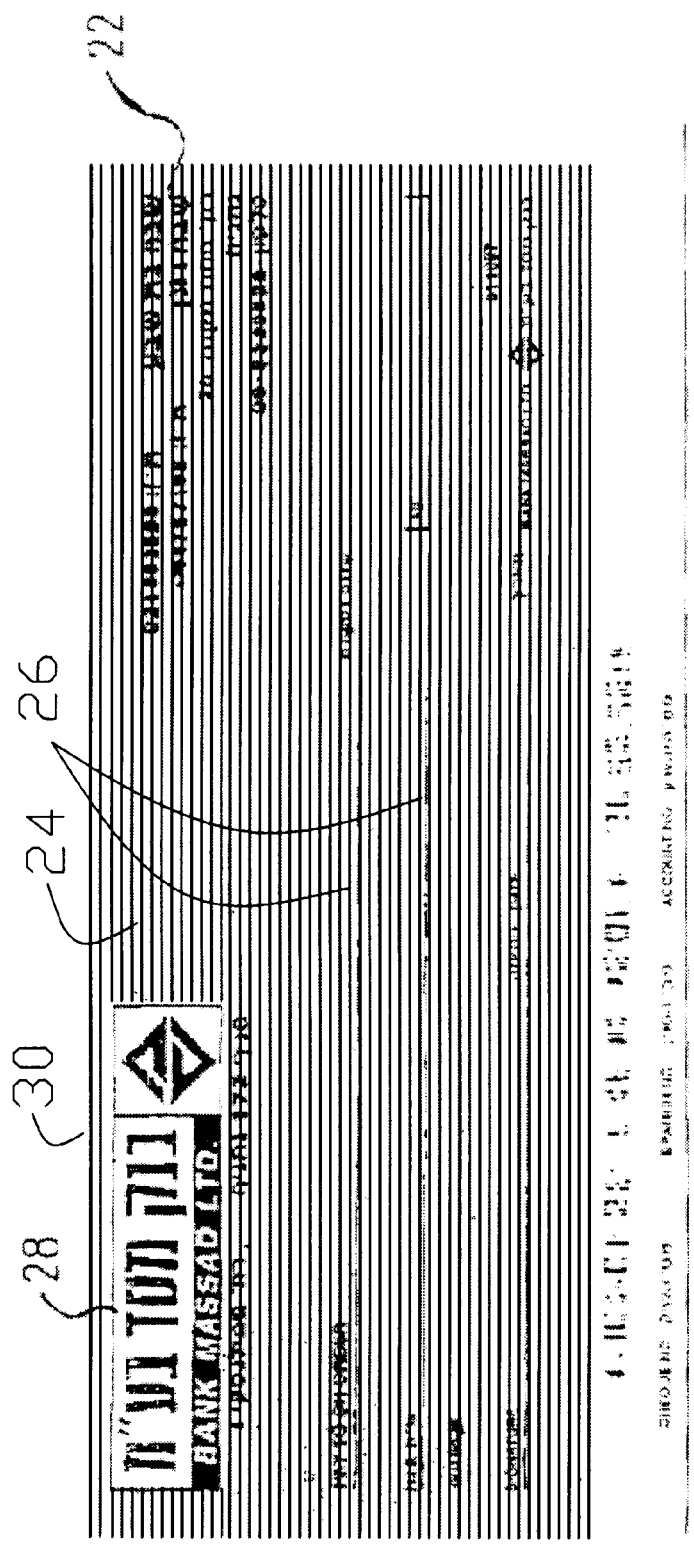
FIGS. 2 and 3 are schematic reproductions of binary images generated by processing the gray-level image of FIG. 1 using known methods of binarization.
Figure 3:
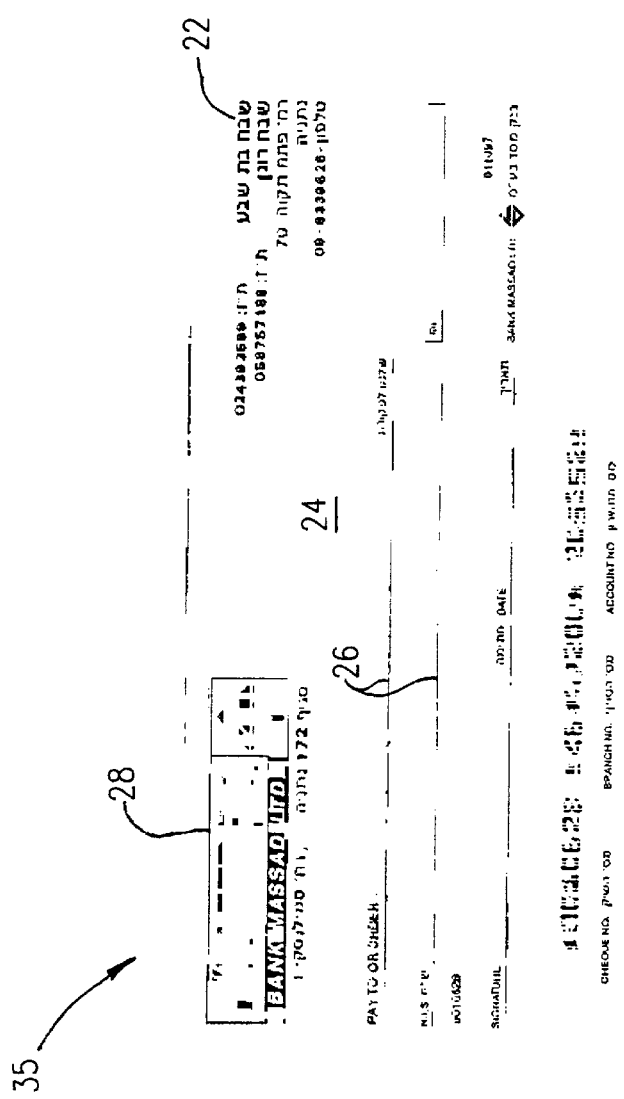

FIGS. 1–3 are schematic reproductions of images of a check 20 presented for the sake of comparing different methods of image binarization. FIG. 1 is a gray-level image of the check as it is captured by a document scanner. The check includes printed characters 22 on a textured background 24, along with other features such as lines 26 and a logo 28. Such a check might be submitted by a taxpayer together with his tax return forms. All of the forms are scanned, and their images are stored by the tax authorities for later reference. The images are typically binarized before storage in order to reduce the volume of stored data. It is generally important that the lines, logo and other identifying details be preserved in the image, so that the check (or other document) can be clearly identified when it is recalled from storage.

FIGS. 2 shows an image 30 of the check after binarization using an algorithm that generally works well on document images. The algorithm is designed for documents having a plain background and fails on the textured background of the check.

FIG. 3 shows an image 35 of the check after binarization using an algorithm that is specifically "tuned" for text. The algorithm is described in U.S. patent application Ser. No. 09/310,287, which is assigned to the assignee of the present patent application, and whose disclosure is incorporated herein by reference. In this case, the characters are clear, but portions of lines 26 and logo 28 are lost. The difficulties illustrated by FIGS. 2 and 3 are overcome by preferred embodiments of the present invention.

Figure 4:
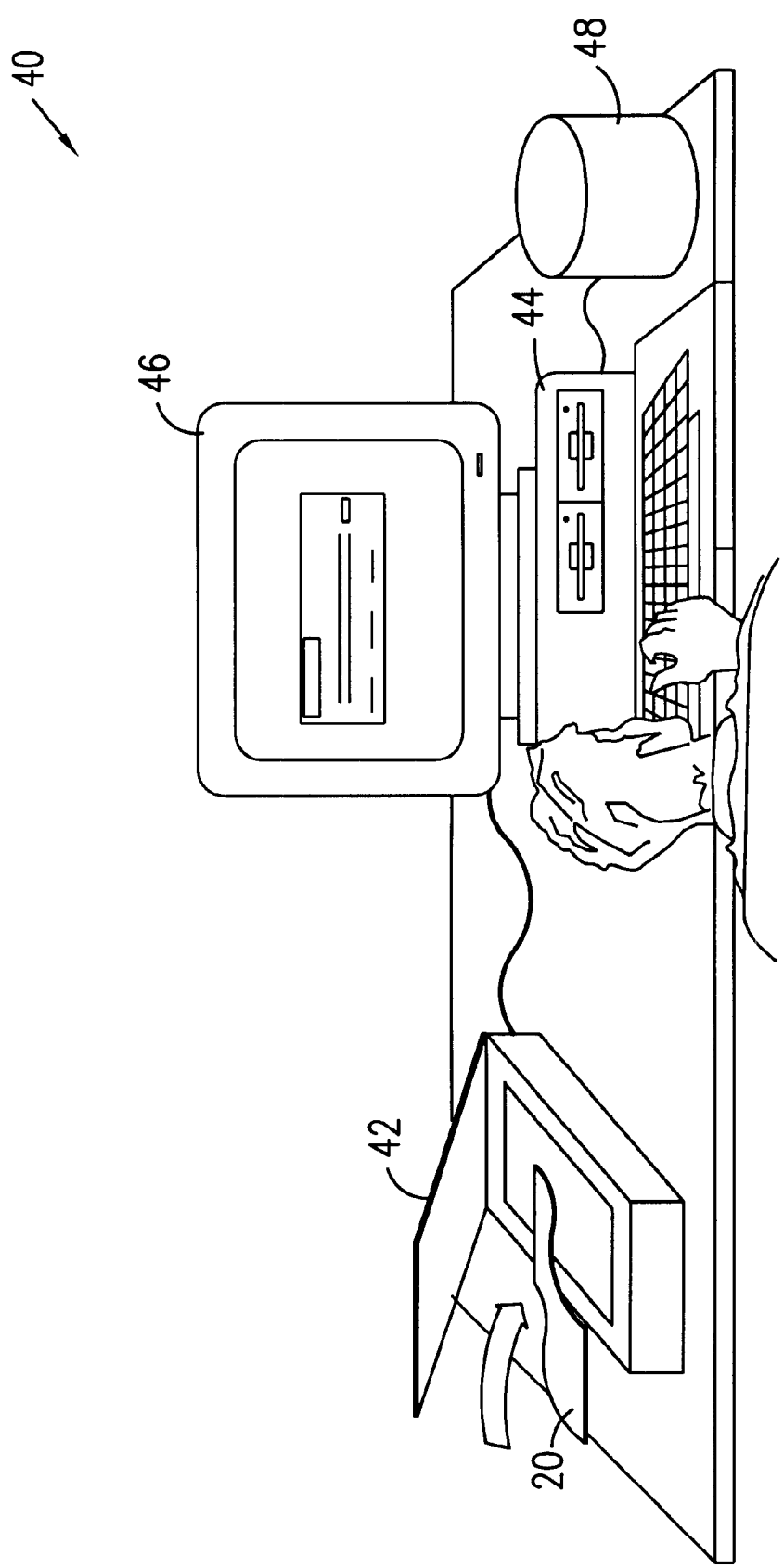
FIG. 4 is a schematic, pictorial illustration of image processing apparatus, in accordance with a preferred embodiment of the present invention.

Reference is now made to FIG. 4, which is a schematic, pictorial representation of image processing apparatus 40, in accordance with a preferred embodiment of the present invention. The apparatus comprises a scanner 42, or any other suitable type of image capture device known in the art, which receives and scans a document, such as check 20 (FIG. 1). The scanner captures a gray-scale image of the document and conveys the corresponding image data to an image processor 44, typically comprising a suitable general-purpose computer. Alternatively, the image is input to the processor from another source. Processor 44 processes the gray-scale image to generate a trinary image of the document, and then further processes the trinary image to generate a binary image, using methods described hereinbelow. The trinary or binary image is typically displayed on a monitor 46 and/or stored in a mass memory 48 for later recall. The images may also be printed or transmitted over a network, as well as being subject to further processing, using methods of optical character recognition (OCR) known in the art, for example.

The image processing functions of processor 44 are preferably performed using software running on the processor, which implements an embodiment of the present invention, as described in detail hereinbelow. The software may be supplied on tangible media, such as diskettes or CD-ROM, and loaded into the processor. Alternatively, the software may be downloaded to the processor via a network connection or other electronic link. Further alternatively, processor 44 may comprises dedicated, hard-wired elements or a digital signal processor for carrying out some or all of the image processing steps.

Figure 5:
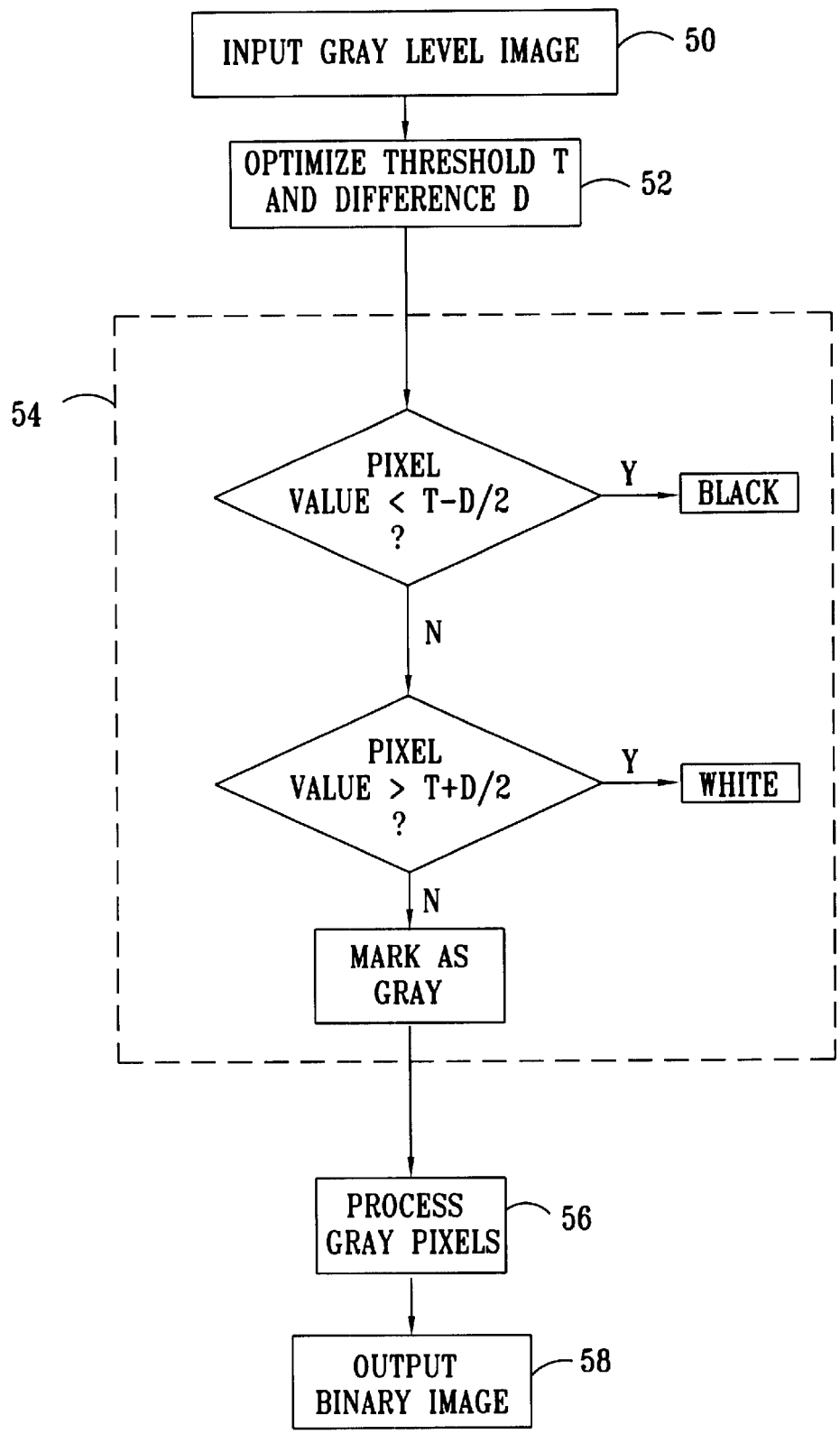
FIG. 5 is a flow chart that schematically illustrates a method for image binarization, in accordance with a preferred embodiment of the present invention.

FIG. 5 is a flow chart that schematically illustrates a method for binarizing gray-level images, in accordance with a preferred embodiment of the present invention. A gray-level image, such as the image of FIG. 1, is input to processor 44 at an image input step 50. The gray-level values of the pixels, and particularly the gaps between the values of neighboring pixels, are analyzed, at an optimization step 52, to find an optimal middle threshold value T and a difference value D. T and D define an upper threshold value, given by T+D/2, and a lower threshold value, given by T−D/2. At a trinarization step 54, all of the pixels in the input image are classified into three groups: those having gray-level values below the lower threshold are marked as black (or foreground—typically binary 1); those above the upper threshold are marked as white (or background—binary 0); and those intermediate the upper and lower thresholds are marked as gray. The result is a trinary image, which may be displayed on monitor 46 or stored in memory 48.

At step 52, the values of T and D are chosen so as to increase the number of significant edges in the input image that are preserved in the output binary image, while decreasing the number of artifact edges that occur. For this purpose, we define a "significant gap" between two neighboring pixels as a gap whose absolute size is greater than D. We say that a gap is "represented" in an output binary image I (T), generated using T as the binarization threshold, if the pixels on either side of the gap have different binary values in I (T). In other words, the gap is represented if one of the pixels in the input image has a gray-level value greater than T, and the other is less than T. The optimal values of T and D are then preferably found by maximizing a merit function of T and D that is chosen to meet the following criteria:

1. Correlate positively with the number of significant gaps in the input image that are represented in I (T);
2. Correlate negatively with the number of insignificant gaps in the input image that are represented in I (T); and
3. Correlate negatively with the number of significant gaps in the input image that are not represented in I (T).

To calculate such a merit function, let N (T,D) be a weighted count of insignificant gaps in the input image that are represented in I (T). Preferably, the weighting is such that the smaller the gap that is represented in I (T), the greater is its weight. } In other words, each gap counted in N (T,D) has one pixel with a gray-level value greater than T, and the other pixel with a gray-level value less than T, with the absolute difference between gray-level values being no more than D. Let MAX denote the highest gray-level value in the image, so that N (T,MAX) is the weighted count of all of the gaps represented in I (T). Let G (D) be a weighted count of the number of significant gaps in the image, i.e., gaps having an absolute difference greater than D between the pixel gray-level values. The following metrics are then defined:

1. good (T,D)=N (T,MAX)−N (T,D), the weighted count of significant gaps represented in I (T);
2. artifacts (T,D) N (T,D), insignificant gaps represented in I (T);
3. missed (T,D)=G (D)−good (T,D), significant gaps that are missed in I (T). These metrics correspond to the three criteria listed above. The merit score of any pair (T,D) is then given by:

Score (T,D)=good (T,D)−artifacts (T,D)−missed (T,D)

The pair (T,D) that gives the highest score is chosen for use at step 54.

This merit score and method for choosing T and D are described above by way of example, and other scores and methods may also be used to optimize T and D. For example, the weights assigned to the gaps may be varied. Also, although "gaps" are defined herein as referring to neighboring pixels, the pixels need not be immediate neighbors, but may rather be a small distance apart. In addition, it may not be necessary to evaluate all of the gaps in the image, but rather representative samples may be taken. Furthermore, since the purpose of evaluating the gaps is primarily to choose values of T and D that will preserve true edges in the binary image, an edge operator, such as a Sobel transform, may be used to identify edges in the gray-scale image. T and D may then be optimized over the pixel gaps that correspond to these edges. Other information cues in the gray-scale image, such as V-shaped intensity profiles ("roof edges"—commonly encountered in thin lines and text features), may similarly be used for this purpose. Other methods for choosing the upper and lower threshold values will be apparent to those skilled in the art and are considered to be within the scope of the present invention.

Returning now to FIG. 5, at a gray pixel processing step 56, the intermediate pixels are processed separately, and are preferably assigned binary values. A preferred method for binarization of the intermediate pixels is described hereinbelow with reference to FIG. 6. In an alternative embodiment, a text-oriented binarization algorithm, such as that used to generate image 35 in FIG. 3, is applied to the gray-level input image. The intermediate (gray) pixels from step 54, and optionally the white pixels, as well, are then assigned the binary values generated by the text-oriented binarization algorithm. Other methods for processing the intermediate pixels will be apparent to those skilled in the art and are considered to be within the scope of the present invention. Alternatively, the intermediate pixels are not binarized, and their gray level values are stored and displayed along with the binary values of the other pixels.

Once all of the pixels have been binarized, the binary image is output for display, storage or further processing, at an output step 58. Optionally, the trinary image is output, as well.

Figure 6:
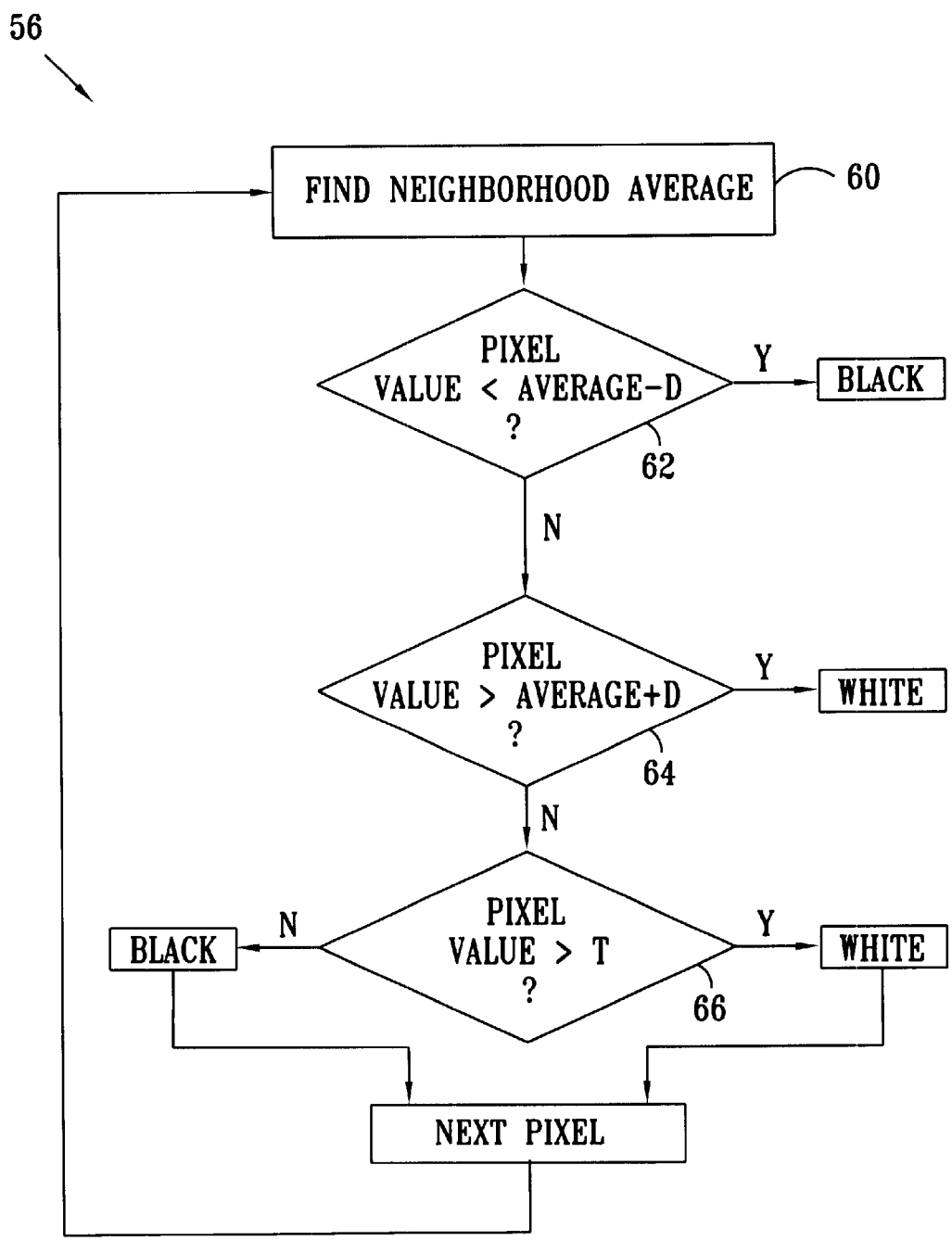
FIG. 6 is a flow chart that schematically illustrates details of the method of FIG. 5, in accordance with a preferred embodiment of the present invention.

FIG. 6 is a flow chart that schematically illustrates details of gray pixel processing step 56, in accordance with a preferred embodiment of the present invention. The essence of the method of FIG. 6 is that pixels that stand out as being significantly brighter or darker than their neighbors are respectively marked as white or black. Thus, for each of the intermediate pixels, a local average of the gray-level values of the pixels in its neighborhood is determined, at an averaging step 60. At a black pixel step 62, those pixels whose gray-level values are less than the local average by a difference greater than D are assigned to be binary black. Pixels whose gray-level values are greater than the local average by more than D are assigned to be binary white, at a white pixel step 64. Alternatively, another suitable difference value may be used in place of D at steps 62 and 64. Further alternatively or additionally, other measures and operators, such as edge operators, may be used to find the pixels that stand out among the intermediate pixels.

The remaining pixels, which have not been categorized at step 62 or 64, are processed at a thresholding step 66. Preferably, these pixels are simply binarized about the threshold T, so that pixels with gray-levels values greater than T are assigned to binary white, and the other pixels to binary black. Alternatively, another method of thresholding may be used.

Figure 7:
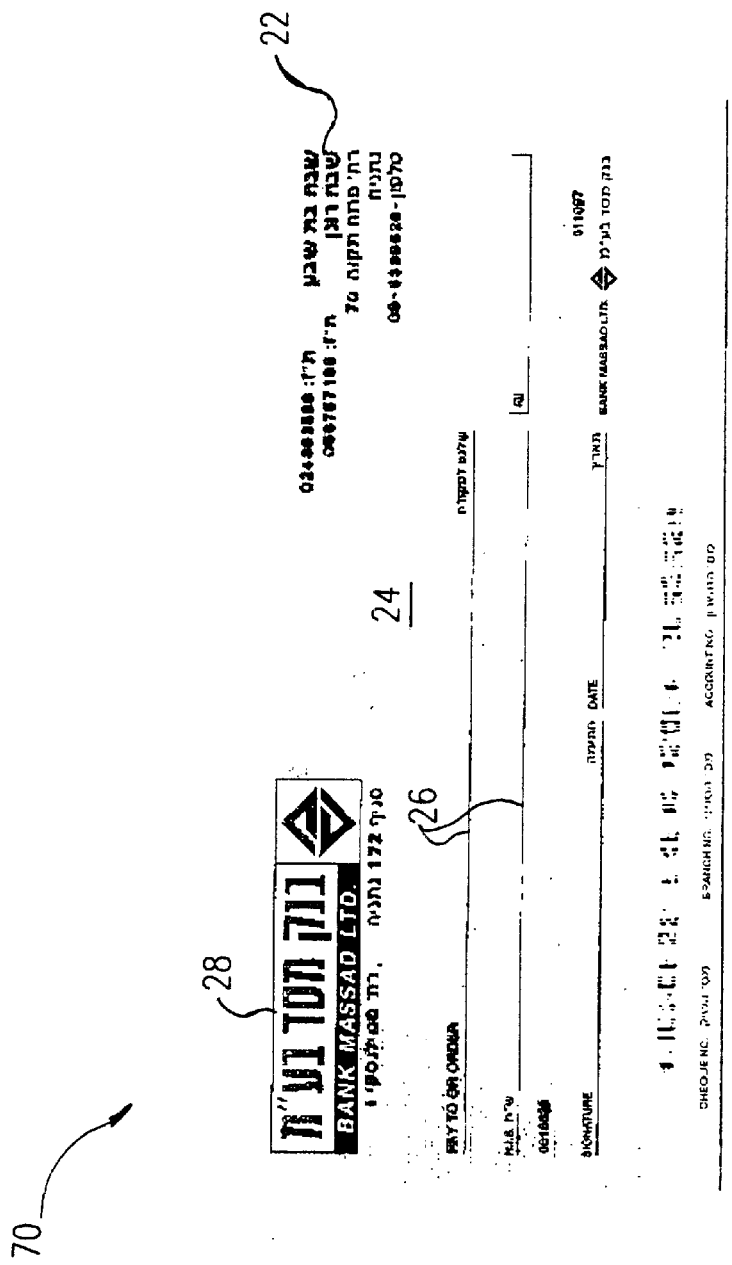
FIG. 7 is a schematic reproduction of a binary image generated by processing the gray-level image of FIG. 1 using the method of FIGS. 5 and 6.

FIG. 7 is a schematic representation of a binary image 70 of check 20, generating using the method of FIGS. 5 and 6, in accordance with a preferred embodiment of the present invention. While characters 22 are not quite as clear as in FIG. 3, lines 26 and logo 28 are accurately reproduced.

Although preferred embodiments are described hereinabove with reference to document imaging, it will be understood that the principles of the present invention may similarly be used in other image processing applications. For example, the methods described herein may be adapted to detect edges with a given, relatively uniform strength in an image and to distinguish between the edges in the image that really represent salient features and those that arise due to artifacts or are otherwise insignificant. The methods of the present invention may also applied, mutatis mutandis, to color images and to images of three-dimensional objects.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for image binarization, comprising:

receiving a gray-level input image comprising a plurality of pixels having respective gray-level values;

analyzing variations among the gray-level values of the pixels in the input image so as to determine image statistics with respect to gaps between the gray-level values of neighboring pixels;

responsive to the image statistics, determining a lower threshold and an upper threshold, which is greater than the lower threshold by a selected difference;

assigning a first binary value to the pixels in the gray-level image having gray-level values above the upper threshold and a second binary value to the pixels in the gray-level image having gray-level values below the lower threshold; and processing the pixels in an intermediate group having gray-level values between the lower and upper thresholds so as to determine optimal assignments of the pixels in the intermediate group to the first and second binary values.

2. A method according to claim 1, wherein analyzing the variations among the gray-level values comprises finding edges in the input image, and wherein determining the thresholds comprises selecting the thresholds so as to preserve the edges in an output image made up of the assigned binary values.

3. A method according to claim 1, wherein determining the thresholds comprises selecting the thresholds so as to preserve the gaps that are significant in preference to the gaps that are not significant in an output image made up of the assigned binary values.

4. A method according to claim 3, wherein selecting the thresholds comprises defining the gaps that are significant as those whose absolute magnitude is greater than the selected difference between the upper and lower thresholds.

5. A method according to claim 1, wherein determining the thresholds comprises selecting the thresholds so as to preserve edge information in an output image made up of the assigned binary values.

6. A method according to claim 5, wherein selecting the thresholds comprises choosing the thresholds substantially without dependence on the type of image feature to which the information belongs.

7. A method according to claim 5, wherein selecting the thresholds comprises finding an optimal average value of the upper and lower thresholds and finding an optimal value of the selected difference between the thresholds.

8. A method according to claim 1, wherein processing the pixels in the intermediate group comprises analyzing variations among the gray-level values of the pixels in the input image and determining the assignments of the pixels to the first and second binary values responsive to the analyzed variations.

9. A method according to claim 8, wherein determining the assignments responsive to the analyzed variations comprises finding a significant difference between the gray-level value of one of the pixels and the gray-level values of other pixels in its neighborhood, and assigning the pixel to the first or second binary value responsive to the difference.

10. A method according to claim 1, wherein processing the pixels in the intermediate group comprises applying a binarization method optimized for text to determine the optimal assignments of the pixels in the intermediate group.

11. A method according to claim 1, and comprising outputting a binary image made up of the assigned binary values of the pixels.

12. A method for image binarization, comprising:

receiving a gray-level input image comprising a plurality of pixels having respective gray-level values;

analyzing variations among the gray-level values of the pixels in the input image so as to find gaps between the gray-level values of neighboring pixels;

responsive to the gaps that are found, determining a lower threshold and an upper threshold, which is greater than the lower threshold by a selected difference;

assigning a first binary value to the pixels in the gray-level image having gray-level values above the upper threshold and a second binary value to the pixels in the gray-level image having gray-level values below the lower threshold; and processing the pixels in an intermediate group having gray-level values between the lower and upper thresholds so as to determine optimal assignments of the pixels in the intermediate group to the first and second binary values, wherein the thresholds are selected so as to preserve the gaps that are significant in preference to the gaps that are not significant in an output image made up of the assigned binary values, wherein the significant gaps are defined as those whose absolute magnitude is greater than the selected difference between the upper and lower threshold, and wherein the thresholds are selected so as to maximize a merit score computed for multiple different pairs of upper and lower thresholds, wherein the score correlates positively with the number of significant gaps preserved in the output image by the selected thresholds, and correlates negatively with the number of gaps that are not significant that are preserved and the number of significant gaps that are not preserved in the output image by the selected thresholds.

13. A method for processing a gray-level input image, which includes a plurality of pixels having respective gray-level values, the method comprising:

analyzing variations among the gray-level values of the pixels in the input image;

responsive to the analyzed variations, determining a lower threshold and an upper threshold, which is greater than the lower threshold by a selected gap size;

assigning a first binary value to the pixels in the gray-level image having gray-level values above the upper threshold and a second binary value to the pixels in the gray-level image having gray-level values below the lower threshold; and generating an output image, in which the pixels assigned the first and second binary values are represented by their respective binary values, and the pixels in an intermediate group having gray-level values between the lower and upper thresholds are represented by their respective gray-level values.

14. A method according to claim 13, wherein determining the thresholds comprises selecting the thresholds so as to preserve edge information in the output image.

15. A method according to claim 13, wherein generating the output image comprises displaying the output image.

16. A method according to claim 13, wherein generating the output image comprises storing the output image in a memory.

17. Apparatus for image binarization, comprising an image processor, which is coupled to receive a gray-level input image comprising a plurality of pixels having respective gray-level values, and which is adapted to analyze variations among the gray-level values of the pixels in the input image so as to determine image statistics with respect to gaps between the gray-level values of neighboring pixels, and responsive to the statistics, to determine a lower threshold and an upper threshold, which is greater than the lower threshold by a selected difference, to assign a first binary value to the pixels in the gray-level image having gray-level values above the upper threshold and a second binary value to the pixels in the gray-level image having gray-level values below the lower threshold, and to process the pixels in an intermediate group having gray-level values between the lower and upper thresholds so as to determine optimal assignments of the pixels in the intermediate group to the first and second binary values.

18. Apparatus according to claim 17, wherein the processor is adapted to determine the assignments of the pixels in the intermediate group to the first and second binary values responsive to the analyzed variations.

19. Apparatus according to claim 17, wherein the processor is adapted to select the thresholds so as to preserve edge information in an output image made up of the assigned binary values, substantially without dependence on the type of image feature to which the information belongs.

20. Apparatus according to claim 17, wherein the processor is adapted to apply a binarization method optimized for text to determine the optimal assignments of the pixels in the intermediate group.

21. Apparatus according to claim 17, wherein the processor is adapted to output a binary image made up of the assigned binary values of the pixels.

22. Apparatus for processing a gray-level input image, which includes a plurality of pixels having respective gray-level values, the apparatus comprising an image processor, which is adapted to analyze variations among the gray-level values of the pixels in the input image and, responsive to the analyzed variations, to determine a lower threshold and an upper threshold, which is greater than the lower threshold by a selected gap size, and to assign a first binary value to the pixels in the gray-level image having gray-level values above the upper threshold and a second binary value to the pixels in the gray-level image having gray-level values below the lower threshold, thus to generate an output image, in which the pixels assigned the first and second binary values are represented by their respective binary values, and the pixels in an intermediate group having gray-level values between the lower and upper thresholds are represented by their respective gray-level values.

23. Apparatus according to claim 22, and comprising a display, which is coupled to the processor so as to receive and display the output image.

24. Apparatus according to claim 22, and comprising a storage memory, which is coupled to the processor so as to receive and store the output image.

25. A computer software product for processing an input image, comprising a computer-readable medium having program instructions stored therein, which instructions, when read by a computer, cause the computer to receive a gray-level input image comprising a plurality of pixels having respective gray-level values, to analyze variations among the gray-level values of the pixels in the input image so as to determine image statistics with respect to gaps between the gray-level values of neighboring pixels, and responsive to the statistics, to determine a lower threshold and an upper threshold, which is greater than the lower threshold by a selected difference, to assign a first binary value to the pixels in the gray-level image having gray-level values above the upper threshold and a second binary value to the pixels in the gray-level image having gray-level values below the lower threshold, and to process the pixels in an intermediate group having gray-level values between the lower and upper thresholds so as to determine optimal assignments of the pixels in the intermediate group to the first and second binary values.

26. A product according to claim 25, wherein the instructions further cause the computer to output a binary image made up of the assigned binary values of the pixels.

27. A computer software product for processing a gray-level input image, which includes a plurality of pixels having respective gray-level values, the product comprising a computer-readable medium having program instructions stored therein, which instructions, when read by a computer, cause the computer to analyze variations among the gray-level values of the pixels in the input image and, responsive to the analyzed variations, to determine a lower threshold and an upper threshold, which is greater than the lower threshold by a selected gap size, to assign a first binary value to the pixels in the gray-level image having gray-level values above the upper threshold and a second binary value to the pixels in the gray-level image having gray-level values below the lower threshold, and to generate an output image, in which the pixels assigned the first and second binary values are represented by their respective binary values, and the pixels in an intermediate group having gray-level values between the lower and upper thresholds are represented by their respective gray-level values.

\* \* \* \* \*